(12) United States Patent
Marzluf

(10) Patent No.: US 6,597,535 B1
(45) Date of Patent: *Jul. 22, 2003

(54) PROCESS AND DEVICE FOR RECOGNIZING TAPE CASSETTES OF DIFFERENT PLAYING TIMES

(75) Inventor: Axel Marzluf, Villingen-Schwenningen (DE)

(73) Assignee: Thomson Licensing, S.A., Boulogne-Billancourt (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/553,345

(22) PCT Filed: May 14, 1994

(86) PCT No.: PCT/EP94/01571
§ 371 (c)(1),
(2), (4) Date: Mar. 11, 1996

(87) PCT Pub. No.: WO94/28548
PCT Pub. Date: Dec. 8, 1994

(30) Foreign Application Priority Data

May 28, 1993 (DE) .......................... 43 17 761

(51) Int. Cl.[7] .................. G11B 27/17; G11B 27/34; G11B 25/06
(52) U.S. Cl. .................................... 360/137; 360/94
(58) Field of Search ............................ 360/137, 94

(56) References Cited

U.S. PATENT DOCUMENTS

| | | | | |
|---|---|---|---|---|
| 4,217,615 A | * | 8/1980 | Suzuki | 360/137 |
| 4,280,159 A | * | 7/1981 | Nakayama | 360/137 |
| 4,996,611 A | * | 2/1991 | Ito | 360/137 |
| 5,883,772 A | * | 3/1999 | Kloster | 360/137 |

FOREIGN PATENT DOCUMENTS

| | | |
|---|---|---|
| EP | 0216260 | 4/1987 |
| EP | 0457946 | 11/1991 |
| FR | 2411151 | 7/1979 |
| GB | 2211651 | 7/1989 |
| JP | 02-058787 | 2/1990 |
| WO | WO80/01522 | 7/1980 |

OTHER PUBLICATIONS

*Patent Abstracts of Japan, vol. 14, No. 238, May 21, 1990 and Japanese Patent No. 02–058787.

* cited by examiner

Primary Examiner—Craig A. Renner
(74) Attorney, Agent, or Firm—Joseph S. Tripoli; Reitseng Lin

(57) ABSTRACT

A method for the determination of the cassette type of a cassette, which contains a recording medium in the form of tape for recording and/or replaying information using an apparatus having a measurement device for measuring the tape thickness and the tape length of the recording medium, and for producing a control variable for indicating the cassette type or for initiating cassette-type-dependent functions of the apparatus. The steps include determining a value for the tape thickness, determining a value for the tape length, and logically linking the value for the tape thickness and the value for the tape length to one another, to ascertain the cassette type.

2 Claims, 2 Drawing Sheets

PROCESS AND DEVICE FOR RECOGNIZING TAPE CASSETTES OF DIFFERENT PLAYING TIMES

FIELD OF THE INVENTION

The invention relates to a method and a device for recognition of cassettes, such as different types of VHS video magnetic tape cassettes for example, for recording and/or replaying information, having a recording medium in the form of tape and having different playing times.

BACKGROUND OF THE INVENTION

Although magnetic tape cassettes for television video recording and/or replay apparatuses, called video recorders in the following text, are externally of the same size, they can nevertheless have different playing times. For example, for VHS video recorders there are standardized tape cassettes having a total playing time of 30 minutes (E 30), 60 minutes (E 60), 90 minutes (E 90), 120 minutes (E 120), 180 minutes (E 180), 195 minutes (E 195), 210 minutes (E 210), 240 minutes (E 240) and 300 minutes (E 300) which—as is illustrated in the following table for these various cassette types—are implemented using two different reel core diameters $D_0$ and three different tape thicknesses d or tape thickness ranges. In addition to these tape cassettes, there are also two further tape cassettes, which are intended to camcorders and have a playing time of 30 minutes (EC 30) and 45 minutes (EC 45), which are smaller externally and, as is known, can also be played in a video recorder by means of a so-called adaptor cassette.

| Cassette type | d ($\mu$m) | $D_0$ (mm) |
|---|---|---|
| E 30 | 17.0 ± 20.0 | 62 |
| E 60 | 17.0 ± 20.0 | 62 |
| E 90 | 17.0 ± 20.0 | 62 |
| E 120 | 17.0 ± 20.0 | 26 |
| E 180 | 17.0 ± 20.0 | 26 |
| E 195 | 17.0 ± 20.0 | 26 |
| E 210 | 15.1 ± 16.1 | 26 |
| E 240 | 15.1 ± 16.1 | 26 |
| E 300 | 12.5 ± 13.0 | 26 |
| EC 30 | 17.0 ± 20.0 | 26 |
| EC 45 | 15.1 ± 16.1 | 26 |

For type recognition of such tape cassettes, it is known, for example from European Patent Application EP-A-0 216 260, for the instantaneous circumference of both tape reels, formed by the respective reel core and its instantaneous tape quantity, to be determined at a predetermined tape drive speed via a measurement of the time of revolution of the tape reels in order then to identify the cassette type used by forming the sum of the squares of the two instantaneous tape reel circumferences, with this sum subsequently being compared with a corresponding comparison value range which is provided in a comparator. The method is based on the sum of the respective area of the two tape reels being constant at any winding time. However, this method is unsuitable for unambiguous type recognition of tape cassettes having different playing times, in which the sum of the squares of the two instantaneous tape reel circumferences would overlap because of the different tape thickness d, such as cases where a E 180 or E 210 is used, for example, as well as in cases where a E 195 or E 240 is used.

It is furthermore known for the respectively used cassette type to be identified via a determination of the tape running time. Although this method, which is based on an exact measurement of the tape thickness d, also allows reliable indicator results in cases where an E 180 or E 210 and an E 195 or E 240 are used, a time of several minutes is required, however, for this purpose before the respective cassette type is identified.

SUMMARY OF THE INVENTION

It is thus the object of the invention to shorten the time for a reliable cassette-type indication in particular of all the tape cassettes which are used in a VHS video recorder.

This object is achieved by the features specified in claim 1 and claim 2. Advantageous developments of the invention are described in the respective subclaims.

The invention is based on the knowledge that, by interpretation of the tape thickness and tape quantity or tape length of the recording medium, even those cassettes can be distinguished and can thus be determined in the case of which the sum of the squares of the two instantaneous tape reel circumferences would entirely or partially overlap because of different tape thickness and tape length. In principle, one measurement for the tape thickness and one measurement for the tape quantity or tape length are in each case logically linked to one another for this purpose.

As a result of the fact that the respective cassette type can be recognized by logically linking these two different characteristic features, it is not necessary to determine these features exactly, which fact is used according to the invention for considerably faster tape identification of tape cassettes. A relatively rough determination of the tape thickness and/or the tape quantity of the recording medium is thus sufficient to be able to carry out a corresponding classification of the tape thickness or tape quantity predetermined by the respective cassette standard.

In addition, the method according to the invention has the advantage that it can be implemented, for example, by minor modification outlay to a circuit device, which is provided anyway for a recorder, for determining the tape running time.

BRIEF DESCRIPTION OF DRAWINGS

The invention is explained in more detail in the following text in an exemplary embodiment and with reference to the drawing, in which.

DETAILED DESCRIPTION OF THE INVENTION

Figure 1:
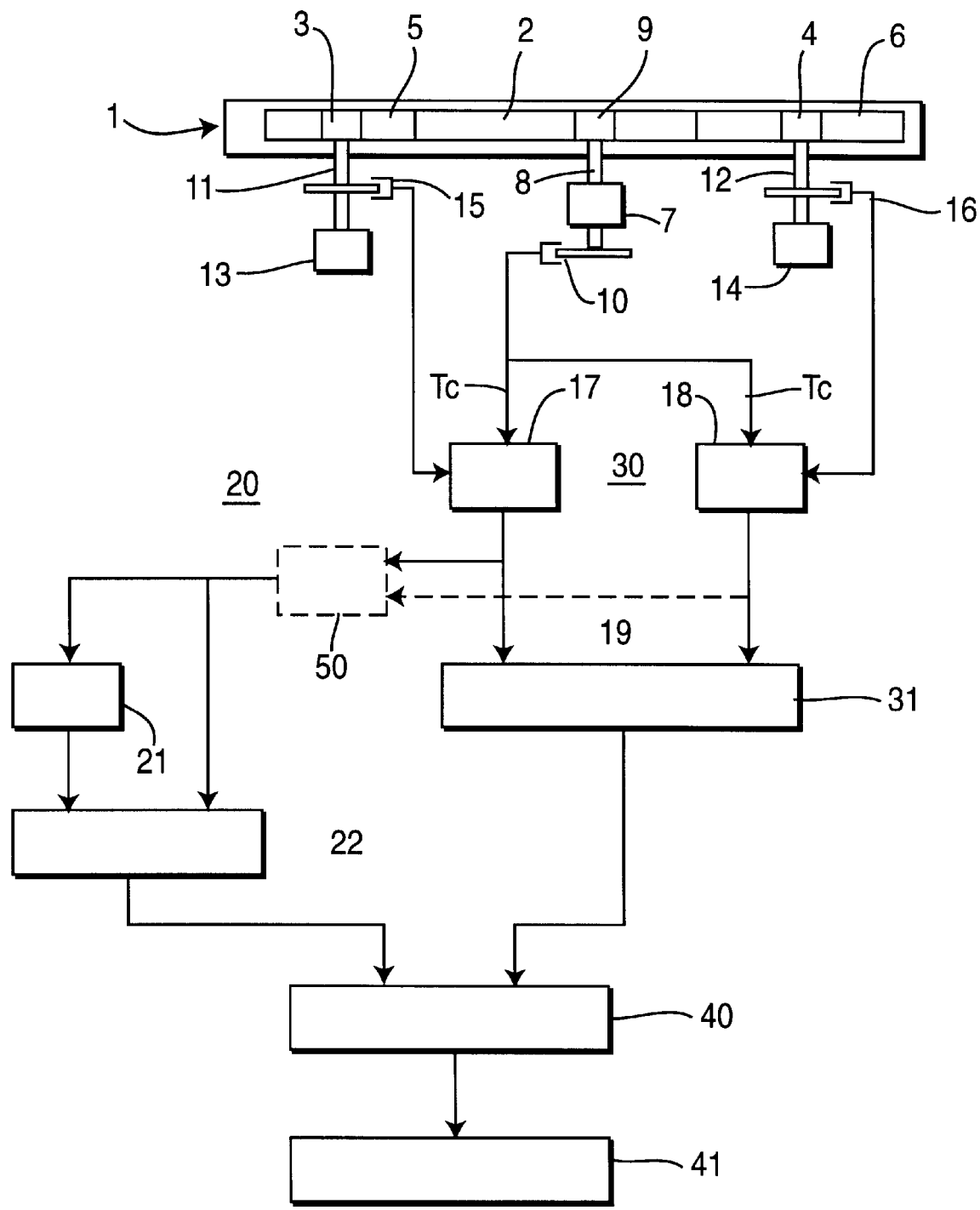
FIG. 1 shows a schematic block diagram of a preferred exemplary embodiment.

FIG. 1 shows a schematic illustration of a tape cassette 1 which is inserted into a recording and/or replay apparatus and has a recording medium 2, which is wound on two reel cores 3 and 4, with an outline functional block diagram for the tape cassette type determination according to the invention. Depending on the transportation direction of the recording medium 2, the two reel cores 3 and 4 can be driven via a shaft 11; 12 which is driven by a motor 13; 14. Each reel core 3; 4 is coupled to a pulse transmitter 15; 16. Each pulse transmitter 15; 16, which preferably produces an output pulse $T_1$; $T_2$ after each revolution of the associated reel core, is electrically connected to a measurement circuit 17; 18, called the first measurement circuit 17 and the second measurement circuit 18 in the following text.

In order to record and/or replay information, the recording medium 2 is driven at a constant speed between the unwinding tape reel 5 and the winding-up tape reel 6. Driving in this case takes place in a known manner by means of the capstan shaft 8, which is driven by a regulated drive motor 7, with the aid of a tape pinch roller 9. A tachogenerator 10, which is connected both to the first measurement circuit 17 and to the second measurement circuit 18, is coupled to the capstan shaft 8. The tachogenerator 10 produces tacho pulses $T_C$ at the same interval, which are on the one hand used for detection of the instantaneous drive speed of the recording medium 2 and on the other hand are used for measurement of the instantaneous revolution time or of the instantaneous tape reel circumference of one reel core and/or of the other reel core by measuring the number of tacho pulses $T_C$ between two pulses $T_1$; $T_2$ of the pulse transmitter 15; 16, for example for determination of the tape thickness, tape length, cassette type and/or remaining playing time of the recording medium 2. The tachogenerator is dimensioned such that several hundred tacho pulses $T_C$ are produced per reel core revolution when the recording medium 2 is being driven. Alternatively, a constant-frequency signal from another frequency generator in the apparatus can be used instead of the tacho pulses $T_C$ to measure the instantaneous revolution time or the instantaneous tape reel circumference of one reel core and/or of the other reel core.

In the preferred exemplary embodiment, the first measurement circuit 17, which is essentially composed of a counting circuit, forms together with the pulse transmitter 15 and the tachogenerator 10 as well as a memory circuit 21 a measuring device 20 by means of which a change in the circumference of the unwound tape reel 5 is measured after at least one reel core revolution as a measure of the tape thickness of the recording medium 2. In this case, the respective tape reel circumference measurement is based on the following relationship (1):

$$U = k \times \frac{d_c \times \pi}{f_c} \qquad (1)$$

where:
 U=tape reel circumference
 dc=diameter of the capstan shaft 8,
 fc=number of tacho pulses $T_C$ for one revolution of the capstan shaft,
 k=measured number of tacho pulses $T_C$ for one complete revolution of the tape reel or reel core.

Alternatively, as is indicated by the dashed line 19, a change in the circumference of the wound-up tape reel 6 can, of course, be measured, as a measure of the tape thickness.

The output of the measurement circuit 17 is connected via the memory circuit 21 to a first input of a first computation device 22. Furthermore, the output is connected directly to a second input of the first computation device 22. A further connection exists from the output of the measurement circuit 17 to a first input of a second computation device 31 which is assigned to a second measurement device 30 which, as will be described later, is used to determine the tape quantity or the tape length of the recording medium 2. The number of tacho pulses $T_C$ or the time for at least one reel core revolution can be stored in the memory circuit 21.

The number of tacho pulses $T_C$ or the time for preferably one reel core revolution is determined and stored in the memory circuit 21, first of all, in a first measurement in order to determine the change in the circumference of the unwound tape reel 5 or of the wound-up tape reel 6 after at least one reel core revolution as a measure of the tape thickness of the recording medium 2. The difference between the stored number of tacho pulses $T_C$ or the time for one reel core revolution and the number of tacho pulses $T_C$ or time for one reel core revolution of a subsequent reel core revolution of the same reel core is formed in a first computation process in the first computation device 22, from which difference the circumference change is then determined in a second computation process in accordance with the following relationship (2):

$$\Delta U = (k_1 - k_1) \times \frac{d_c \times \pi}{f_c} \qquad (2)$$

The tape thickness results from the circumference change in accordance with the following relationship (3):

$$d = \frac{\Delta U}{2 \times \Delta n \times \pi}. \qquad (3)$$

The meanings of the symbols which have not yet been explained are as follows:
 $\Delta U$=circumference change of a tape reel
 d=tape thickness,
 $k_1$=number of tacho pulses $T_C$ of a reel core revolution measured in a first measurement,
 $k_2$=number of tacho pulses $T_C$ of a subsequent reel core revolution of the same reel core measured in a second measurement,
 $\Delta n$=number of reel core revolutions between the first measurement and the second measurement.

The tape thickness d can in this case be determined more precisely the more frequently a difference measurement of tacho pulses $T_C$ is carried out and/or the greater the difference $k_2-k_1$ is between tacho pulses $T_C$ from the first measurement and the second measurement, which, with a predetermined number of tacho pulses per revolution of the capstan shaft 8, can be achieved, for example, by a relative large number of reel core revolutions between the first measurement and the second measurement.

However, it is not necessary to determine the tape thickness d accurately for the cassette-type determination according to the invention. According to the invention, only as many reel core revolutions An are used for difference formation $k_2-k_1$ of tacho pulses $T_C$ as are absolutely essential for it to be possible to classify the recording medium 2 of a tape cassette 1 or just to distinguish between the tape type classes. In the case of a VHS video recorder having, for example, a capstan shaft 8 with a diameter $d_c$=3.52 mm and having a number $f_c$ of 360 tacho pulses $T_C$ per revolution of the capstan shaft 8, just five revolutions of a reel core successively are sufficient to be able to use the difference $k_2-k_1$ between tacho pulses $T_C$ then formed to distinguish definitively and thus to be able to determine to which of the tape thickness ranges 17–20 $\mu$m, 15.1–16.1 $\mu$m or 12.5–13.0 $\mu$m the recording medium 2 of a tape cassette 1 whose cassette type is to be determined must be assigned. Such tape thickness ranges are in each case based, as is known, on a tolerance band, which is predetermined by standards, with respect to a discrete value, also called the nominal value, for a tape thickness d. The respective evaluation of to which tape thickness d or which of the above mentioned tape thickness ranges the respective difference $k_2-k_1$ between tacho pulses $T_C$ should be assigned is in each case carried out after evaluation of the respective difference $k_2-k_1$ by means of comparison value ranges which are stored in the first computation device 22 and contain corresponding comparison values, for example an upper and lower limit value, for in each case one tape type class or for one tape thickness range. As the result of the evaluation, an output signal which characterizes the respective tape thickness d is supplied from the first computation device 22 to an evaluation circuit 40, which is connected to the indicating device 41 of the apparatus and by means of which, according to the invention, the respective cassette type can be determined by evaluation of the output signal, which characterizes the respective tape thickness d, and an output signal, which characterizes the respective tape length, of the second measurement device 30 and of the second computation device 31 respectively.

The second measurement device 30, by means of which the instantaneous circumference of the two tape reels 5 and 6 is measured, comprises the first measurement circuit 17, the second measurement circuit 18, which essentially is likewise composed of a counting circuit, the tachogenerator 10 and the two pulse transmitters 15 and 16, the output signals of the two pulse transmitters 15 and 16 being used to measure the number of tacho pulses $T_C$ per revolution of the two tape reels 5 and 6. The output of the second measurement circuit 18 is connected to a second input of the second computation device 31. The second measurement device 30 uses the output signals of the two pulse transmitters 15 and 16 and the tacho pulses $T_C$ of the tachogenerator 10 to form output signals which correspond to the instantaneous circumference of the two tape reels 5 and 6, and supplies these output signals to the second computation device 31. In the second computation device 31, the sum of the square of the instantaneous circumference of the two tape reels 5 and 6 is formed from the output signals of the second measurement device 30 and is supplied to the evaluation circuit 40 in order to determine the tape length.

The tape length L of the recording medium 2 of a tape cassette 1 can be characterized on the basis of the following relationship (4), by the sum of the square of the instantaneous circumference of the two tape reels 5 and 6.

$$L = \frac{U_5^2 + U_6^2 + 2U_k^2}{4d\pi} \quad (4)$$

The meanings of the symbols which have not yet been explained are as follows:

L=tape length of the recording medium of a tape cassette,
$U_5^2$=square of the instantaneous circumference of the tape reel 5,
$U_6^2$=square of the instantaneous circumference of the tape reel 6,
$U_k^2$=square of the circumference of the reel core 3 or 4.

However, it is not necessary to determine the tape length L accurately for the determination of the cassette type according to the invention. The determination of the tape length L is thus likewise carried out by evaluation of the output signal of the second computation device 31 using comparison value ranges which can be stored, for example, in the evaluation circuit 40. Each of these comparison value ranges contains comparison values, for example an upper and a lower limit value, for in each case one of the tape length ranges which, as is known, are likewise based on a tolerance band, which is predetermined by standards, with respect to a nominal value for the tape length. An unambiguous statement on the tape length or the tape length range is, however, in this way possible only for those tape cassette types which have no overlap with another cassette type in terms of the sum of the square of the instantaneous circumference of the tape reels 5 and 6. However, this at the same time also means that it would be possible to distinguish a E 195 or E 210 VHS tape cassette, which will appear commercially at a later point in time, from the E 240 and E 180 tape cassettes respectively (and vice versa of course) only by determining the tape length L, which, as results from the above mentioned relationship (4), is predicated on knowing the exact tape thickness d in addition to the sum of the square of the instantaneous circumference of the two tape reels 5 and 6 and the sum of the square of the two reel core circumferences $U_k^2$. In contrast, in the case of the cassette type determination according to the invention, whose flow chart is illustrated by way of example in FIG. 2, neither accurate determination of the tape length L nor accurate determination of the tape thickness d is necessary. The invention also covers, of course, cassette type determination of the smaller EC 30 and EC 45 cassette types used in camcorders. As already mentioned initially, these cassettes are played with the aid of an adaptor cassette which drives the winding-up tape reel core via a drive system. In consequence, a tape length measurement and a tape thickness measurement are obtained for these cassette types, which measurements are not identical to the corresponding tape length measurement and are not identical to the corresponding tape thickness measurement in the case of a normal cassette having the same tape thickness but are greater in proportion to the step-up factor of the drive system.

In this context, it should be mentioned that the individual blocks 17, 18, 21, 22, 31 and 40 are used for better understanding of the invention. Normally, individual blocks or a plurality of these blocks are combined in an integrated circuit, which can contain a control circuit or a microcomputer, by means of which the interaction of the circuit arrangement with the indication device 41 and the operating device, which is not illustrated, is controlled.

In order that an optimally short determination time for the cassette type can always be ensured, since a plurality of reel core revolutions are used for the tape thickness measurement according to the invention and the time for the cassette type recognition is thus essentially determined by the tape thickness measurement, a circuit 50 can be provided, which compares the number of tacho pulses $T_C$ per revolution of the two reel cores 3 and 4 with one another and decides on the basis of the comparison result that the tape reel having the respectively smaller circumference is in each case used to measure the tape thickness d for the cassette type measurement.

Figure 2:
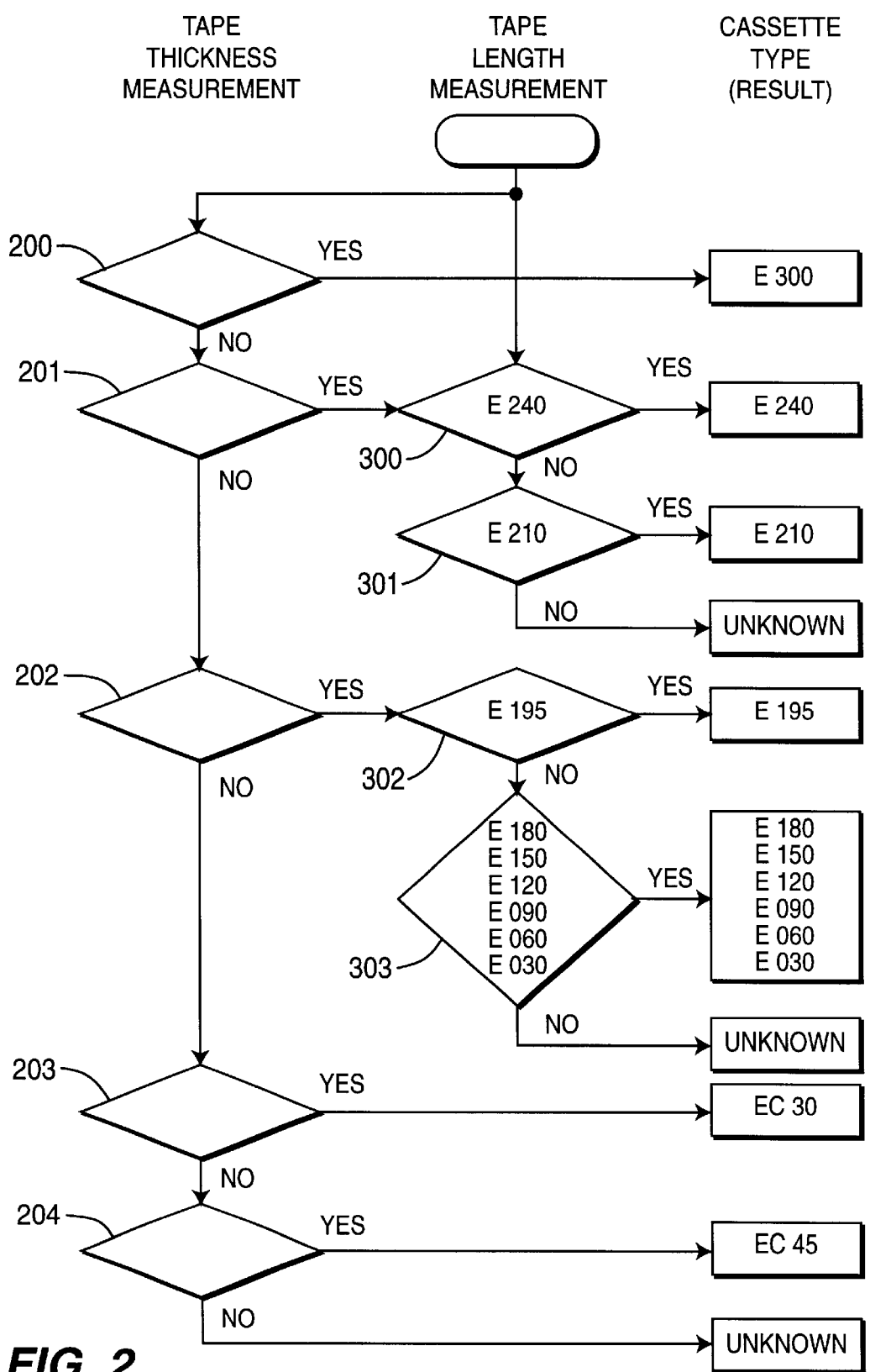
FIG. 2 shows a flow diagram of the sequence of the method according to the invention in a circuit arrangement according to FIG. 1.

FIG. 2 shows, in a flow diagram, the logic sequence of the method according to the invention for cassette type determination. This comprises essentially a routine which is composed of a plurality of decision steps 200–204, for the evaluation of results of the tape thickness measurement according to the invention, a further routine, which is logically linked with this routine, with decision steps 300–303, in order together with the measurement results of the tape length measurement according to the invention to be able to determine the respective cassette type of a tape cassette 1.

The cassette type determination is carried out as follows: at the start of the cassette type determination process, the measurement circuits 17 and 18 and the contents of the memory circuit 21 are set to the value 0. The counting of tacho pulses $T_C$ for the cassette type determination according to the invention is then started. A question is asked in block 200 as to whether, in the case of a measurement which represents a tape thickness, this is a tape thickness of the cassette type E 300. If this is the case, it is possible immediately to indicate the cassette type, namely E 300, on the basis of the fact that only the E 300 has such a tape thickness (12.5 to 13.0 $\mu$m). If the measurement is not the tape thickness of the E 300 cassette type, a question is asked in the subsequent block 201 as to whether this measurement corresponds to the tape thickness (15.1 to 16.1 $\mu$m), which both the E 240 cassette type and the E 210 cassette type have, as well as the small EC 45 cassette type which is used in camcorders. If this is the case, a question is asked in block 300 as to whether the tape length measurement result is the tape length of the E 240 cassette type. If this is the case, the E 240 cassette type is indicated as the result of the evaluation of the tape thickness measurement result and tape length measurement result. However, if the tape length measurement does not correspond to the tape length of the E 240 cassette type, a question is asked in block 301 as to whether the measurement corresponds to the tape length of the E 180 cassette type. If this is the case, the E 210 cassette type is indicated, since such a tape cassette on the one hand has the tape thickness of the E 240 cassette type and on the other hand cannot be distinguished from the E 180 cassette type in terms of the area occupied by the two tape reels and reel cores. If the question in block 301 does not lead to a result, then the measurement process for cassette type determination according to the invention can be repeated at least once and, in the event of non-identification, can be indicated as the evaluation result "unknown" or a symbol having the same meaning.

If the evaluation of a tape thickness measurement in block 201 produces a negative result, a question is asked in block 202 as to whether the measurement corresponds to the tape thickness (17.0 to 20.0 $\mu$m). which is used in the E 180, E 150, E 120, E 90, E 60 and E 30 cassette types and the smaller EC 30 cassette type used in camcorders. If this is the case, the first question is as to whether the tape length measurement corresponds to the tape length of the E 240 cassette type. If this is the case, the E 195 cassette type is indicated, since the areas occupied by the two tape reels and reel cores of the cassette types E 240 and E 195 can admittedly completely overlap in the worst case, but the E 240 cassette type has a different tape type class from that determined. If the question result according to the block 302 is negative, then further questions, which are represented by a block 303, are asked to determine whether the tape length measurement corresponds to an E 180, E 150, E 120, E 90, E 60 or E 30 cassette type and, if the result is positive, the respective E 180, E 150, E 120, E 90, E 60 or E 30 cassette type is indicated. If, in contrast, a question result according to block 303 is negative, then the method according to the invention for cassette type determination can likewise be repeated at least once and the confirmation of negative evaluation results can be indicated as an "unknown" indication or as a symbol having the same meanings.

However, if the question result according to block 202 is negative, a question is subsequently asked in block 203 as to whether the tape thickness measurement corresponds to the tape thickness (17.0 to 20.0 $\mu$m), enlarged by the step-up factor, of the smaller EC 30 cassette type used in camcorders. If the evaluation result according to block 203 is positive, the EC 30 cassette type is indicated. If, in contrast, the evaluation result is negative, a further question is asked according to block 204 as to whether the tape thickness measurement corresponds to the tape thickness (15.1 to 16.1 $\mu$m), enlarged by the step-up factor, of the smaller EC 45 cassette type used in camcorders. If this evaluation result is positive, the EC 45 cassette type is indicated. If, in contrast, the evaluation result according to block 204 is negative, the method according to the invention for cassette type determination can be repeated at least once and, if the negative evaluation result is confirmed, can be indicated as the "unknown" indication or a symbol having the same meaning.

What is claimed is:

1. Device for determination of the cassette type of a cassette, which contains a recording medium in the form of tape, for recording and/or replaying information, having a measuring device for measuring the tape thickness and having a measuring device for measuring the tape length of the recording medium wherein an evaluation circuit determines whether cassette type which differs from another one in reel hub diameter can also be identified whereby a measurement which characterizes the tape thickness and a measurement which characterizes the tape length are logically linked to one another.

2. Device according to claim 1, wherein a circuit is provided, which compares a first number of pulses per revolution of a first reel core with a second number of pulses per revolution of a second reel core, each said reel core having a corresponding tape reel, and decides in accordance with the comparison result that the corresponding tape reel respectively having the smaller circumference is in each case used for measurement of the tape thickness for the cassette type determination.

* * * * *